United States Patent
Chiu et al.

(10) Patent No.: US 10,771,163 B2
(45) Date of Patent: Sep. 8, 2020

(54) APPARATUS AND METHOD FOR DECODING ROI REGIONS IN IMAGE

(71) Applicant: MEDIATEK INC., Hsin-Chu (TW)

(72) Inventors: Min-Hao Chiu, Hsin-Chu (TW); Chia-Yun Cheng, Hsin-Chu (TW); Yung-Chang Chang, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 106 days.

(21) Appl. No.: 16/163,581

(22) Filed: Oct. 18, 2018

(65) Prior Publication Data

US 2019/0123833 A1  Apr. 25, 2019

Related U.S. Application Data

(60) Provisional application No. 62/576,163, filed on Oct. 24, 2017.

(51) Int. Cl.
| | |
|---|---|
| *H04B 10/69* | (2013.01) |
| *H04N 19/70* | (2014.01) |
| *H04N 19/184* | (2014.01) |
| *G06T 9/00* | (2006.01) |
| *H04N 19/127* | (2014.01) |
| *H04N 19/44* | (2014.01) |
| *H04N 19/42* | (2014.01) |
| *H04N 19/17* | (2014.01) |

(52) U.S. Cl.
CPC .......... *H04B 10/691* (2013.01); *G06T 9/00* (2013.01); *H04N 19/127* (2014.11); *H04N 19/17* (2014.11); *H04N 19/184* (2014.11); *H04N 19/42* (2014.11); *H04N 19/44* (2014.11); *H04N 19/70* (2014.11)

(58) Field of Classification Search
CPC .......... H04N 19/17; H04N 19/70; G06T 9/00; H04B 10/691
See application file for complete search history.

(56) References Cited

U.S. PATENT DOCUMENTS

| | | | |
|---|---|---|---|
| 6,775,412 B1 | 8/2004 | Nister | |
| 9,973,748 B1 * | 5/2018 | Cheng | .................. H04N 19/436 |
| (Continued) | | | |

FOREIGN PATENT DOCUMENTS

| | | |
|---|---|---|
| CN | 102271249 A | 12/2011 |
| CN | 101453639 B | 5/2012 |

*Primary Examiner* — John J Lee
(74) *Attorney, Agent, or Firm* — Winston Hsu

(57) ABSTRACT

A decoding apparatus is used for decoding region of interest (ROI) regions in an image, and includes a storage device, a pre-processing circuit, a decoding circuit, and an information fetching circuit. The pre-processing circuit performs a syntax pre-parsing operation upon a bitstream to obtain necessary information of the ROI regions, and stores the necessary information into the storage device. The decoding circuit performs a decoding operation upon the bitstream to decode the ROI regions, wherein the decoding operation includes syntax parsing of the bitstream. The information fetching circuit reads and analyzes the necessary information, and delivers at least a portion of the necessary information to the decoding circuit. A processing time of obtaining necessary information of one ROI region at the pre-processing circuit overlaps a processing time of decoding another ROI region at the decoding circuit.

20 Claims, 12 Drawing Sheets

(56) References Cited

U.S. PATENT DOCUMENTS

| | | | | |
|---|---|---|---|---|
| 2014/0301458 | A1* | 10/2014 | Rapaka | H04N 19/70 375/240.12 |
| 2015/0382023 | A1* | 12/2015 | Ramasubramonian | H04N 19/30 375/240.25 |
| 2019/0364259 | A1* | 11/2019 | Chen | H04N 13/161 |

* cited by examiner

| RG0 | RG1 | RG2 | RG3 | RG4 |
|---|---|---|---|---|
| RG5 | RG6 (ROI) | RG7 (ROI) | RG8 (ROI) | RG9 |
| RG10 | RG11 | RG12 | RG13 | RG14 |
| RG15 (ROI) | RG16 (ROI) | RG17 (ROI) | RG18 (ROI) | RG19 (ROI) |
| RG20 (ROI) | RG21 (ROI) | RG22 | RG23 | RG24 |

IMG

APPARATUS AND METHOD FOR DECODING ROI REGIONS IN IMAGE

CROSS REFERENCE TO RELATED APPLICATIONS

This application claims the benefit of U.S. provisional application No. 62/576,163, filed on Oct. 24, 2017 and incorporated herein by reference.

BACKGROUND

The present invention relates to video/image decoding, and more particularly, to an apparatus and method for decoding region of interest (ROI) regions in an image.

The conventional video/image coding standards generally adopt a block based coding technique to exploit spatial and temporal redundancy. For example, the basic approach is to perform intra prediction/inter prediction on each block, transform residues of each block, and perform quantization and entropy encoding. Besides, a reconstructed frame is generated to provide reference pixel data used for coding blocks in following frames. For certain video/image coding standards, in-loop filter(s) may be used for enhancing the image quality of the reconstructed frame. A video/image decoder is used to perform an inverse operation of a video/image encoding operation performed by a video/image encoder.

A full image may be divided into multiple regions, and these regions may be coded as sub-images, sub-frames, or tiles. Some of the regions in an image may be categorized as region of interest (ROI) regions, while the rest of the regions in the same image may be categorized as non-ROI regions. For certain applications, only the ROI regions in an image are needed to be decoded at a decoder side. Thus, there is a need for an innovative video/image decoding design which is capable of decoding ROI regions in an efficient way.

SUMMARY

One of the objectives of the claimed invention is to provide an apparatus and method for decoding region of interest (ROI) regions in an image.

According to a first aspect of the present invention, an exemplary decoding apparatus for decoding region of interest (ROI) regions in an image is disclosed. The exemplary decoding apparatus includes a storage device, a pre-processing circuit, a decoding circuit, and an information fetching circuit. The pre-processing circuit is arranged to perform a syntax pre-parsing operation upon a bitstream to obtain necessary information of the ROI regions, and store the necessary information of the ROI regions into the storage device. The decoding circuit is arranged to perform a decoding operation upon the bitstream to decode the ROI regions, wherein at least a portion of the necessary information of the ROI regions is used by the decoding operation, and the decoding operation comprises syntax parsing of the bitstream. The information fetching circuit is arranged to read the necessary information of the ROI regions from the storage device, analyze the necessary information of the ROI regions read from the storage device, and deliver said at least a portion of the necessary information of the ROI regions to the decoding circuit. A processing time of obtaining necessary information of one ROI region at the pre-processing circuit overlaps a processing time of decoding another ROI region at the decoding circuit.

According to a second aspect of the present invention, an exemplary decoding method for decoding region of interest (ROI) regions in an image is disclosed. The exemplary decoding method includes: performing a syntax pre-parsing operation upon a bitstream to obtain necessary information of the ROI regions; storing the necessary information of the ROI regions into a storage device; performing a decoding operation upon the bitstream to decode the ROI regions, wherein at least a portion of the necessary information of the ROI regions is used by the decoding operation, and the decoding operation comprises syntax parsing of the bitstream; and utilizing an information fetching circuit for reading the necessary information of the ROI regions from the storage device, analyzing the necessary information of the ROI regions read from the storage device, and delivering said at least a portion of the necessary information of the ROI regions to the decoding operation. A processing time of obtaining necessary information of one ROI region by the syntax pre-parsing operation overlaps a processing time of decoding another ROI region by the decoding operation.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a diagram illustrating a full image that is divided into a plurality of regions according to an embodiment of the present invention.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
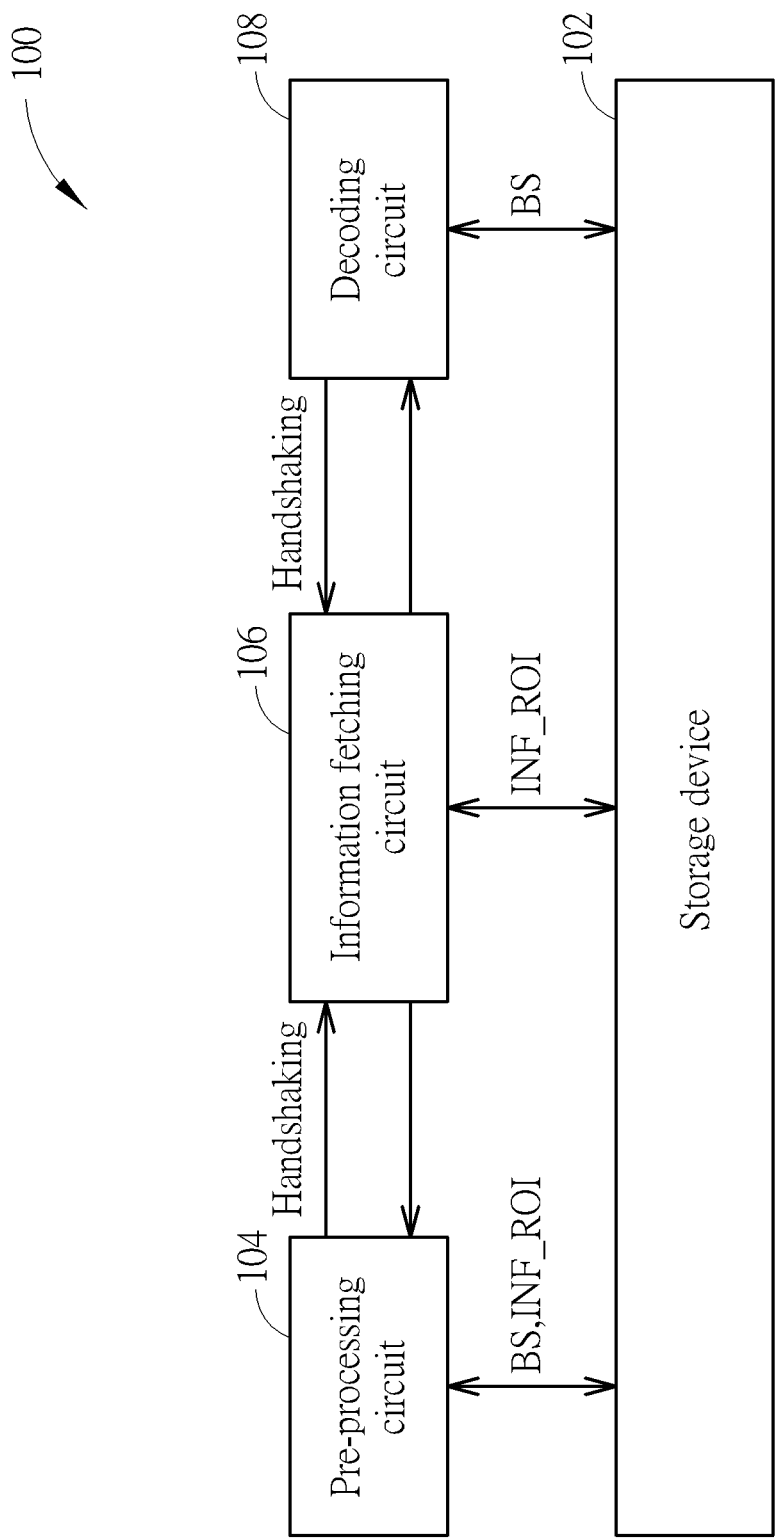
FIG. 1 is a diagram illustrating a decoding apparatus according to an embodiment of the present invention.

FIG. 1 is a diagram illustrating a decoding apparatus according to an embodiment of the present invention. The decoding apparatus 100 includes a storage device 102, a pre-processing circuit 104, an information fetching circuit 106, and a decoding circuit 108. The decoding apparatus 100 is used for decoding region of interest (ROI) regions in an image. FIG. 2 is a diagram illustrating a full image that is divided into 25 regions according to an embodiment of the present invention. The image IMG may be a single still image, or may be one of images included in an image sequence. The image IMG is divided into 25 regions RG0-RG24, including ROI regions RG6-RG18 and RG15-RG21 and non-ROI regions RG0-RG5, RG10-RG14, and RG22-RG24. Each of the regions RG0-RG24 may be coded as a sub-image, a sub-frame, or a tile. In this embodiment, the decoding apparatus 100 supports partial decoding of the full image IMG. For example, the decoding apparatus 100 may decode the ROI regions RG6-RG18 and RG15-RG21 only. Hence, non-ROI regions RG0-RG5, RG10-RG14, and RG22-RG24 are not decoded by the decoding apparatus 100. To decode the ROI regions RG6-RG18 and RG15-RG21 in an efficient way, the present invention proposes adding the information fetching circuit 106 between the pre-processing circuit 104 and the decoding circuit 108, as illustrated in FIG. 1.

An encoding apparatus encodes an image to generate a bitstream BS. For example, the regions RG0-RG24 shown in FIG. 2 are coded as sub-images, sub-frames, or tiles in the bitstream BS. After receiving the bitstream BS generated from the encoding apparatus, the decoding apparatus 100 stores the bitstream BS into the storage device 102 for further processing. For example, the storage device 102 may be implemented by a single storage unit (e.g., a single memory), or may be implemented by multiple storage units (e.g., multiple memories). For another example, the storage device 102 may be an internal storage device (e.g., an on-chip memory), an external storage device (e.g., an off-chip memory), or a combination of an internal storage device (e.g., an on-chip memory) and an external storage device (e.g., an off-chip memory).

The pre-processing circuit 104 is arranged to read data of the bitstream BS from the storage device 102, perform a syntax pre-parsing operation upon the bitstream BS to obtain necessary information of ROI regions (e.g., ROI regions RG6-RG8 and RG15-RG21 shown in FIG. 2) INF_ROI, and store necessary information of the ROI regions INF_ROI into the storage device 102. For example, the syntax pre-parsing operation is used for parsing the top-level syntax of ROI regions (e.g., ROI regions RG6-RG8 and RG15-RG21 shown in FIG. 2) to obtain the necessary information INF_ROI. In some embodiments of the present invention, the necessary information INF_ROI may include region_width, region_height, and region_location of each RIO region in the full image, region_bitstream_location of each ROI region in the bitstream, etc. In some embodiments of the present invention, the necessary information INF_ROI may include syntax elements parsed from a slice header, a picture header, and/or a sequence header. In some embodiments of the present invention, the necessary information INF_ROI may include storage locations of decoded ROI regions that are assigned in the storage device 102. In some embodiments of the present invention, the necessary information INF_ROI may include region_bitstream_size of each ROI region in the bitstream that can be used for error handling.

The decoding circuit 108 is arranged to read data of the bitstream BS from the storage device 102, and perform a decoding operation upon the bitstream BS to decode the ROI regions (e.g., ROI regions RG6-RG8 and RG15-RG21 shown in FIG. 2), wherein at least a portion (i.e., part or all) of necessary information of the ROI regions INF_ROI is used by the decoding operation, and the decoding operation comprises syntax parsing of the bitstream BS.

Figure 3:
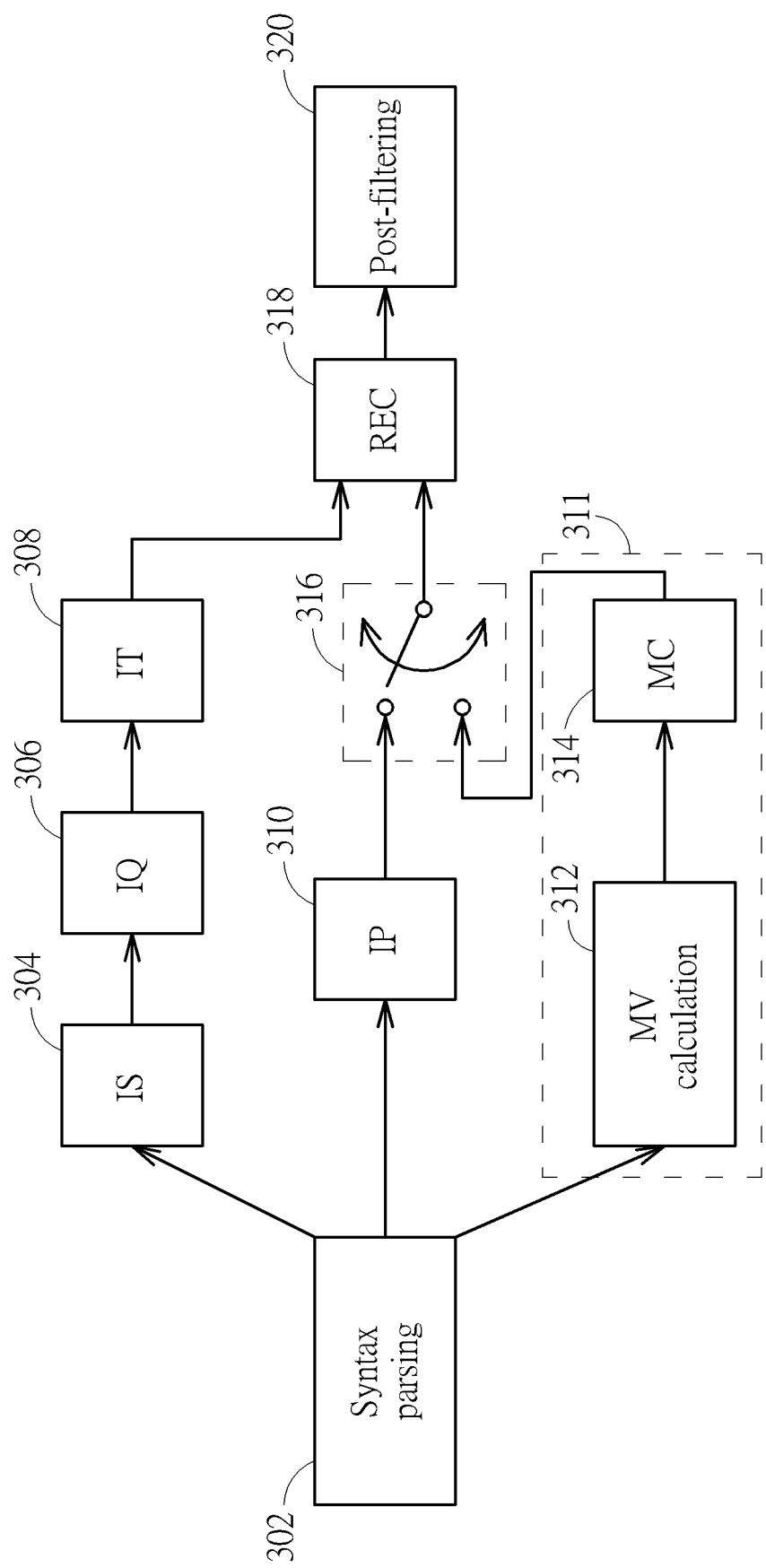
FIG. 3 is a diagram illustrating a decoding circuit according to an embodiment of the present invention.

The decoding circuit 108 may be implemented using any feasible video/image decoder architecture. FIG. 3 is a diagram illustrating a decoding circuit according to an embodiment of the present invention. The decoding circuit 108 shown in FIG. 1 may be implemented using the decoding circuit 300 shown in FIG. 3. The decoding circuit 300 may include a syntax parsing circuit (denoted by "Syntax parsing") 302 for applying syntax parsing to the bitstream BS. For example, the syntax parsing circuit 302 may be an entropy decoder such as a variable-length decoder. Hence, the syntax parsing circuit 302 may output residual data, intra prediction information, and inter prediction information of coding blocks. Regarding processing of the residual data output from the syntax parsing circuit 302, the decoding circuit 300 0 may include an inverse scan circuit (denoted by "IS") 304, an inverse quantization circuit (denoted by "IQ") 306, and an inverse transform circuit (denoted by "IT") 308. Regarding the intra prediction information output from the syntax parsing circuit 302, the decoding circuit 300 may include an intra prediction circuit (denoted by "IP") 310. Regarding the inter prediction information output from the syntax parsing circuit 302, the decoding circuit 300 may include an inter prediction circuit 311 that has a motion vector calculation circuit (denoted by "MV calculation") 312 and a motion compensation circuit (denoted by "MC") 314. The decoding circuit 300 may include a mode selection circuit 316 that is used to output an intra-predicted block obtained by the intra prediction circuit 310 to a reconstruct circuit (denoted by "REC") 318 when a current block is coded under an intra-prediction mode, and is used to output an inter-predicted block obtained by the inter prediction circuit 311 to the reconstruct circuit 318 when the current block is coded under an inter-prediction mode. The reconstruct circuit 318 generates a reconstructed block by combining a predicted block and associated residual data. The reconstructed block may be further processed by a post-filtering circuit (denoted by "post-filtering") 320. For example, the post-filtering circuit 320 may be an in-loop filter such as a deblocking filter.

It should be noted that the video/image decoder architecture shown in FIG. 3 is for illustrative purposes only, and is not meant to be a limitation of the present invention. In practice, the video/image decoder architecture employed by the decoding circuit 108 may vary for different image/video coding standards. To put it simply, the present invention has no limitations on the video/image decoder architecture employed by the decoding circuit 108.

The information fetching circuit 106 is arranged to read necessary information of the ROI regions INF_ROI from the storage device 102, analyze necessary information of the ROI regions INF_ROI read from the storage device 102, and deliver at least a portion (i.e., part or all) of necessary information of the ROI regions INF_ROI to the decoding circuit 108. Since the proposed information fetching circuit 106 is designed to deal with delivery of necessary information of the ROI regions INF_ROI from the pre-processing circuit 104 to the decoding circuit 108, the pre-processing circuit 104 is de-coupled from the decoding circuit 108 due to the proposed information fetching circuit 106. In this way, parallel processing of the pre-processing circuit 104 and the decoding circuit 108 can be achieved to enhance the system performance. For example, a processing time of obtaining necessary information of one ROI region at the pre-processing circuit 104 may overlap a processing time of decoding another ROI region at the decoding circuit 108.

Since the information fetching circuit 106 is responsible for dealing with delivery of necessary information of the ROI regions INF_ROI from the pre-processing circuit 104 to the decoding circuit 108, the information fetching circuit 106 is also responsible for dealing with handshaking with the preceding pre-processing circuit 104 and handshaking with the following decoding circuit 108.

In some embodiments of the present invention, the pre-processing circuit 104 is a processor that performs the syntax pre-parsing operation (e.g., top-level syntax parsing) by executing software (e.g., firmware of decoding apparatus 100), the decoding circuit 108 is a hardware decoder that performs the decoding operation by dedicated hardware, and the information fetching circuit 106 performs handshaking with the pre-processing circuit 104 and handshaking with the decoding circuit 108 by dedicated hardware. In general, the latency consumed by handshaking between software and hardware is much longer than the latency consumed by handshaking between hardware and hardware. In a case where a processor (which performs the syntax pre-parsing operation by executing software) communicates with a hardware decoder (which performs the decoding operation by dedicated hardware) directly, one handshaking operation may be performed between the processor and the hardware decoder for delivering necessary information of each ROI region to the hardware decoder, and another handshaking operation may be performed between the processor and the hardware decoder at the end of decoding each ROI region by the hardware decoder. As a result, the overall system performance may be significantly degraded due to the long handshaking latency between software and hardware. To address this issue, the present invention proposes de-coupling the processor (which performs the syntax pre-parsing operation by executing software) from the hardware decoder (which performs the decoding operation by dedicated hardware) by inserting dedicated info-fetcher hardware between the processor and the hardware decoder. For example, one handshaking operation may be performed between the processor and the dedicated info-fetcher hardware for delivering necessary information of each ROI group (which may include multiple ROI regions) to the dedicated info-fetcher hardware, and another handshaking operation may be performed between the processor and the dedicated info-fetcher hardware at the end of decoding each ROI group (which may include multiple ROI regions) by the hardware decoder. In addition, one handshaking operation may be performed between the hardware decoder and the dedicated info-fetcher hardware for delivering necessary information of each ROI region to the hardware decoder, and another handshaking operation may be performed between the hardware decoder and the dedicated info-fetcher hardware at the end of decoding each ROI region by the hardware decoder. Since the latency consumed by handshaking between hardware and hardware is very short and the communication times between software and hardware can be greatly reduced, the overall system performance can be enhanced.

Figure 4:
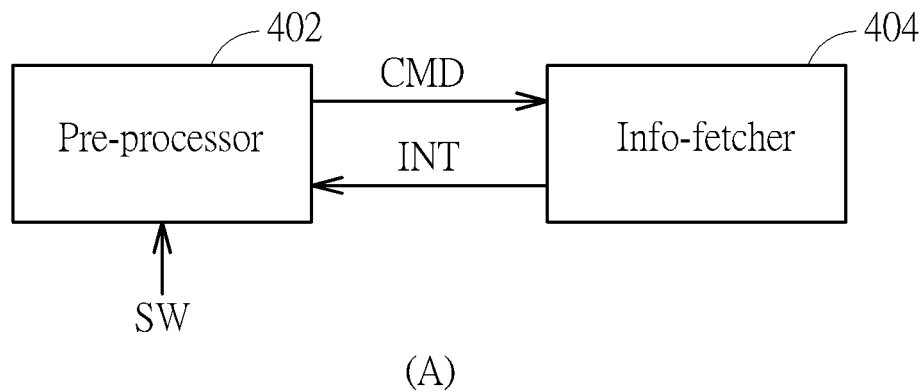
FIG. 4 is a diagram illustrating different handshaking mechanisms between a pre-processor and an info-fetcher according to an embodiment of the present invention.
Figure 4:
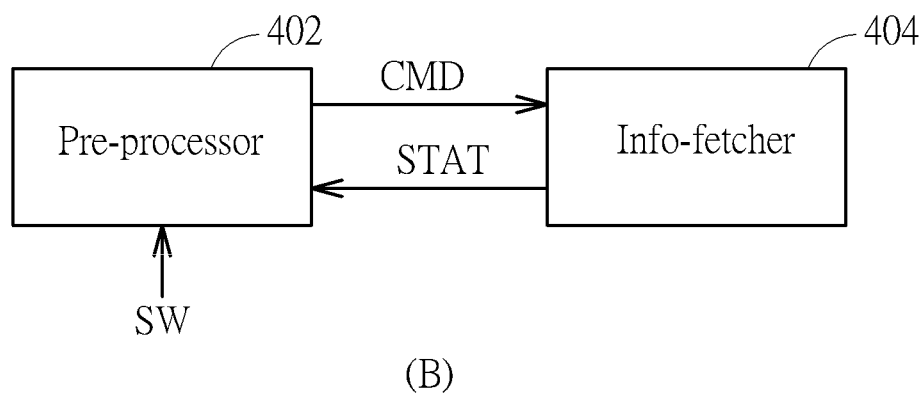
Figure 4:
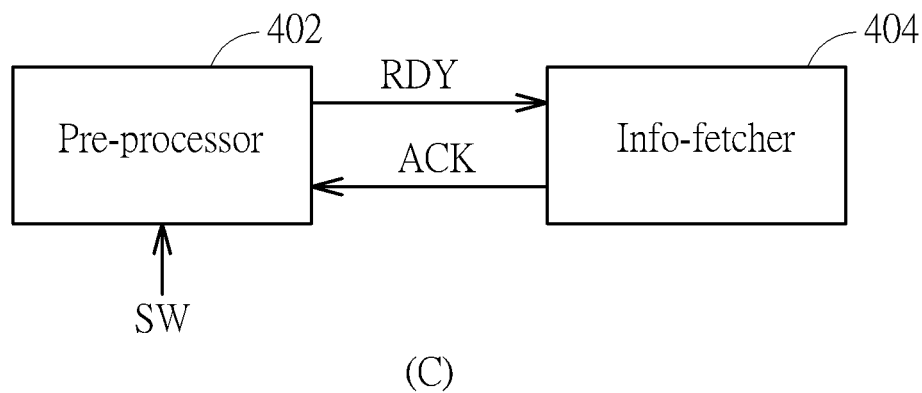

FIG. 4 is a diagram illustrating different handshaking mechanisms between a pre-processor and an info-fetcher according to an embodiment of the present invention. The pre-processor 402 may act as the pre-processing circuit 104, where the syntax pre-parsing operation (e.g., top-level syntax parsing) is achieved by software SW running on the pre-processor 402. For example, the pre-processor 402 may be a central processing unit (CPU), a graphics processing unit (GPU), a digital signal processor (DSP), or a microprocessor. The info-fetcher 404 is dedicated hardware that may act as the information fetching circuit 106 for dealing with handshaking with the software SW running on the pre-processor 402.

The sub-diagram (A) illustrates a first handshaking mechanism between the pre-processor 402 and the info-fetcher 404. The pre-processor 402 issues a command CMD to inform the info-fetcher 404, and the info-fetcher 404 issues an interrupt INT to inform the pre-processor 402.

The sub-diagram (B) illustrates a second handshaking mechanism between the pre-processor 402 and the info-fetcher 404. The pre-processor 402 issues a command CMD to inform the info-fetcher 404. The info-fetcher 404 sets its status STAT to inform the pre-processor 402, where the pre-processor 402 periodically issues a polling command to read the status STAT of the info-fetcher 404.

The sub-diagram (C) illustrates a third handshaking mechanism between the pre-processor 402 and the info-fetcher 404. The pre-processor 402 issues a ready signal RDY to inform the info-fetcher 404, and the info-fetcher 404 issues an acknowledgment signal ACK to inform the pre-processor 402.

Figure 5:
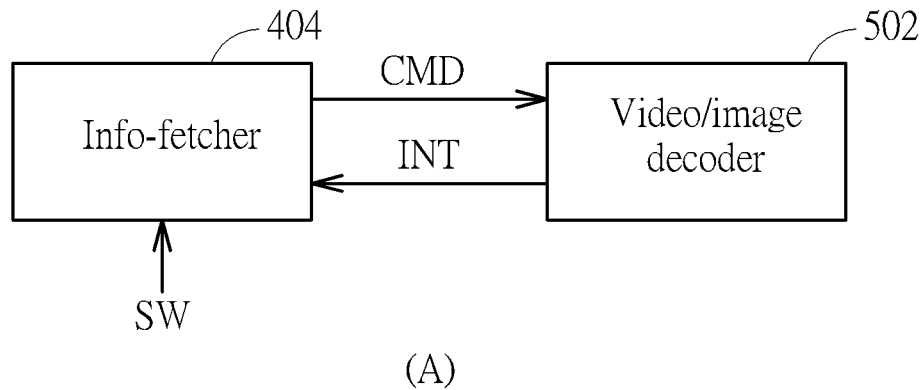
FIG. 5 is a diagram illustrating different handshaking mechanisms between an info-fetcher and a video/image decoder according to an embodiment of the present invention.
Figure 5:
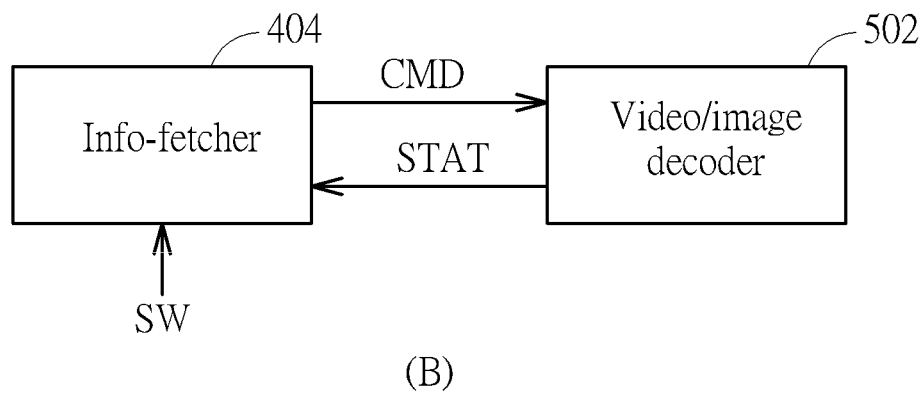
Figure 5:
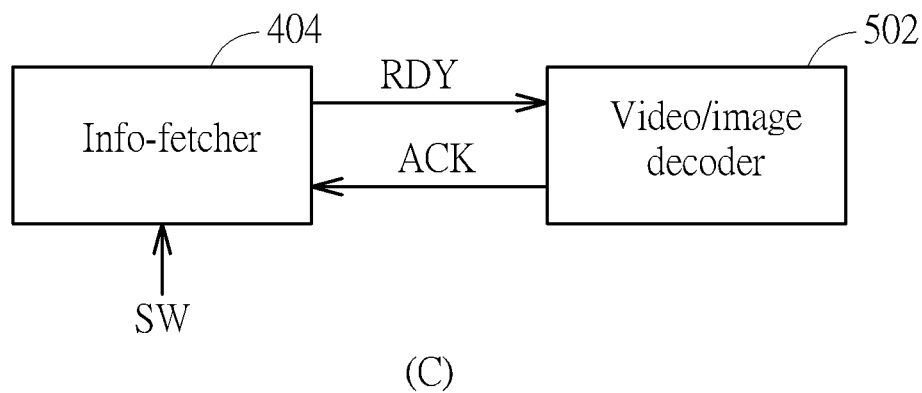

FIG. 5 is a diagram illustrating different handshaking mechanisms between an info-fetcher and a video/image decoder according to an embodiment of the present invention. The video/image decoder 502 is dedicated hardware that may act as the decoding circuit 108, such that hardware video/image decoding is achieved by the video/image decoder 502. The info-fetcher 404 is dedicated hardware that may act as the information fetching circuit 106 for dealing with handshaking with the hardware video/image decoding of the video/image decoder 502.

The sub-diagram (A) illustrates a first handshaking mechanism between the info-fetcher 404 and the video/image decoder 502. The info-fetcher 404 issues a command CMD to inform the video/image decoder 502, and the video/image decoder 502 issues an interrupt INT to inform the info-fetcher 404.

The sub-diagram (B) illustrates a second handshaking mechanism between the info-fetcher 404 and the video/image decoder 502. The info-fetcher 404 issues a command CMD to inform the video/image decoder 502. The video/image decoder 502 sets its status STAT to inform the info-fetcher 404, where the info-fetcher 404 periodically issues a polling command to read the status STAT of the video/image decoder 502.

The sub-diagram (C) illustrates a third handshaking mechanism between the info-fetcher 404 and the video/image decoder 502. The info-fetcher 404 issues a ready signal RDY to inform the video/image decoder 502, and the video/image decoder 502 issues an acknowledgment signal ACK to inform the info-fetcher 404.

Figure 6:
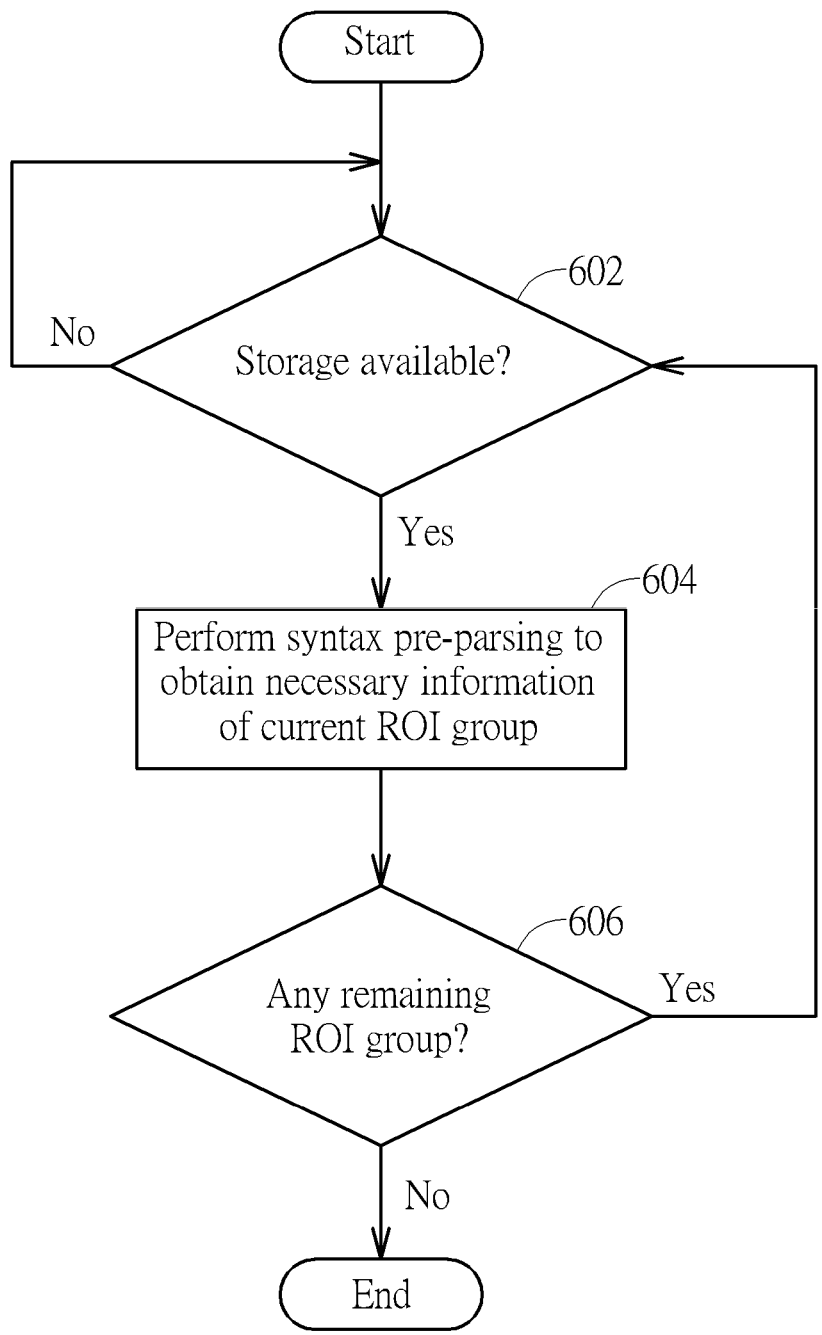
FIG. 6 is a flowchart illustrating a syntax pre-parsing operation according to an embodiment of the present invention.

FIG. 6 is a flowchart illustrating a syntax pre-parsing operation according to an embodiment of the present invention. The syntax pre-parsing operation shown in FIG. 6 may be performed by the pre-processing circuit 104 (or pre-processor 402). At step 602, the pre-processing circuit 104 (or pre-processor 402) checks if the storage device 102 has free space available to the syntax pre-parsing operation. When the storage device 102 is full and has no free space available to the syntax pre-parsing operation (or the storage device 102 is almost full and does not have sufficient free space available to the syntax pre-parsing operation), the flow proceeds with step 602 to check availability of free storage space again.

When the storage device 102 has free space available to the syntax pre-parsing operation, the flow proceeds with step 604. At step 604, the pre-processing circuit 104 (or pre-processor 402) performs the syntax pre-parsing operation to obtain necessary information of a current ROI group, and stores the necessary information of the ROI group into the storage device 102, where each ROI group in an image may include one or more ROI regions in the image. After the necessary information of one ROI group is obtained and stored, the flow proceeds with step 606.

At step 606, the pre-processing circuit 104 (or pre-processor 402) checks if there is any remaining ROI group in the image that is not syntax pre-parsed yet. When syntax pre-parsing of all ROI groups in the image is done, the syntax pre-parsing operation is ended. When there is at least one ROI group that is not syntax pre-parsed yet, the flow proceeds with step 602. In addition, a next ROI group becomes a current ROI group at step 604.

For example, the ROI regions RG6-RG8 shown in FIG. 2 may belong to a first ROI group, the ROI regions RG15-RG19 may belong to a second ROI group, and the ROI regions RG20-RG21 may belong to a third ROI group. The first ROI group, the second ROI group, and the third ROI group may be decoded by the decoding circuit 108 (or video/image decoder 502) sequentially. Hence, the pre-processing circuit 104 (or pre-processor 402) may apply syntax pre-parsing to the first ROI group, the second ROI group, and the third ROI group sequentially. Initially, the pre-processing circuit 104 (or pre-processor 402) performs the syntax pre-parsing operation to obtain necessary information of the first ROI group when the storage device 102 is available due to having free space to store the necessary information of the first ROI group. After syntax pre-parsing of the first ROI group is done, the pre-processing circuit 104 (or pre-processor 402) performs the syntax pre-parsing operation to obtain necessary information of the second ROI group when the storage device 102 is available due to having free space to store the necessary information of the second ROI group. After syntax pre-parsing of the second ROI group is done, the pre-processing circuit 104 (or pre-processor 402) performs the syntax pre-parsing operation to obtain necessary information of the third ROI group when the storage device 102 is available due to having free space to store the necessary information of the third ROI group.

Since the syntax pre-parsing flow of the first ROI group, the second ROI group and the third ROI group is controlled according to the storage space availability at the storage device 102, the pre-processing circuit 104 (or pre-processor 402) performs the syntax pre-parsing operation of the second ROI group, regardless of a progress of decoding the first ROI group at the decoding circuit 108 (or video/image decoder 502); and performs the syntax pre-parsing operation of the third ROI group, regardless of a progress of decoding the second ROI group at the decoding circuit 108 (or video/image decoder 502). In this way, a processing time of obtaining necessary information of one ROI region at the pre-processing circuit 104 (or pre-processor 402) is allowed to overlap a processing time of decoding another ROI region at the decoding circuit 108 (or video/image decoder 502).

Figure 7:
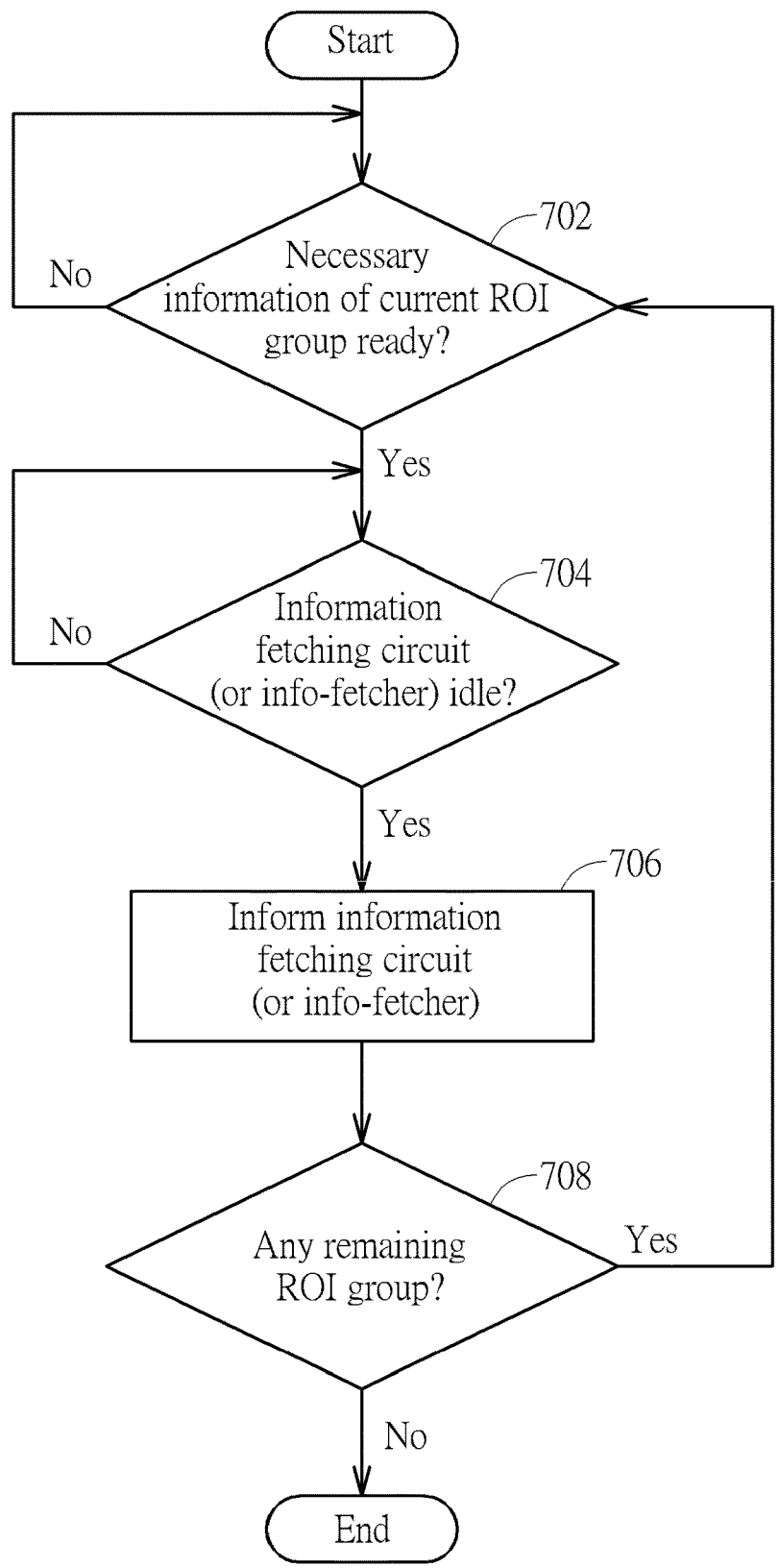
FIG. 7 is a flowchart illustrating handshaking between syntax pre-parsing and information fetching according to an embodiment of the present invention.

FIG. 7 is a flowchart illustrating handshaking between syntax pre-parsing and information fetching according to an embodiment of the present invention. The handshaking operation shown in FIG. 7 may be performed by the pre-processing circuit 104 (or pre-processor 402). At step 702, the pre-processing circuit 104 (or pre-processor 402) checks if necessary information of a current ROI group is ready in the storage device 102, where each ROI group in an image may include one or more ROI regions in the image. When necessary information of the current ROI group is not ready in the storage device 102 yet, the flow proceeds with step 702 to check availability of necessary information of the current ROI group again. When necessary information of the current ROI group is ready in the storage device 102, the flow proceeds with step 704.

At step 704, the pre-processing circuit 104 (or pre-processor 402) checks if the information fetching circuit 106 (or info-fetcher 404) is in an idle state. When the information fetching circuit 106 (or info-fetcher 404) is not in the idle state yet, it means that the information fetching circuit 106 (or info-fetcher 404) is not ready to receive necessary information of the current ROI group yet. Hence, the flow proceeds with step 704 to check availability of the information fetching circuit 106 (or info-fetcher 404) again. When the information fetching circuit 106 (or info-fetcher 404) is in the idle state, it means that the information fetching circuit 106 (or info-fetcher 404) is ready to receive necessary information of the current ROI group. Hence, the flow proceeds with step 706.

At step 706, the pre-processing circuit 104 (or pre-processor 402) informs the information fetching circuit 106 (or info-fetcher 404) that necessary information of the current ROI group is ready in the storage device 102. For example, one of the handshaking mechanisms shown in FIG. 4 may be employed. After the pre-processing circuit 104 (or pre-processor 402) informs the information fetching circuit 106 (or info-fetcher 404), the flow proceeds with step 708.

At step 708, the pre-processing circuit 104 (or pre-processor 402) checks if there is any remaining ROI group in the image. When the current ROI group is the last ROI group in the image, the handshaking operation is ended. When the current ROI group is not the last ROI group in the image, the flow proceeds with step 702. In addition, a next ROI group becomes a current ROI group at step 702.

When the current ROI group includes multiple ROI regions in the image, the pre-processing circuit 104 (or pre-processor 402) informs the information fetching circuit 106 (or info-fetcher 404) once after all necessary information of the multiple ROI regions is ready in the storage device 102. In this way, the communication times between the pre-processing circuit 104 (or pre-processor 402) and the information fetching circuit 106 (or info-fetcher 404) can be reduced.

Figure 8:
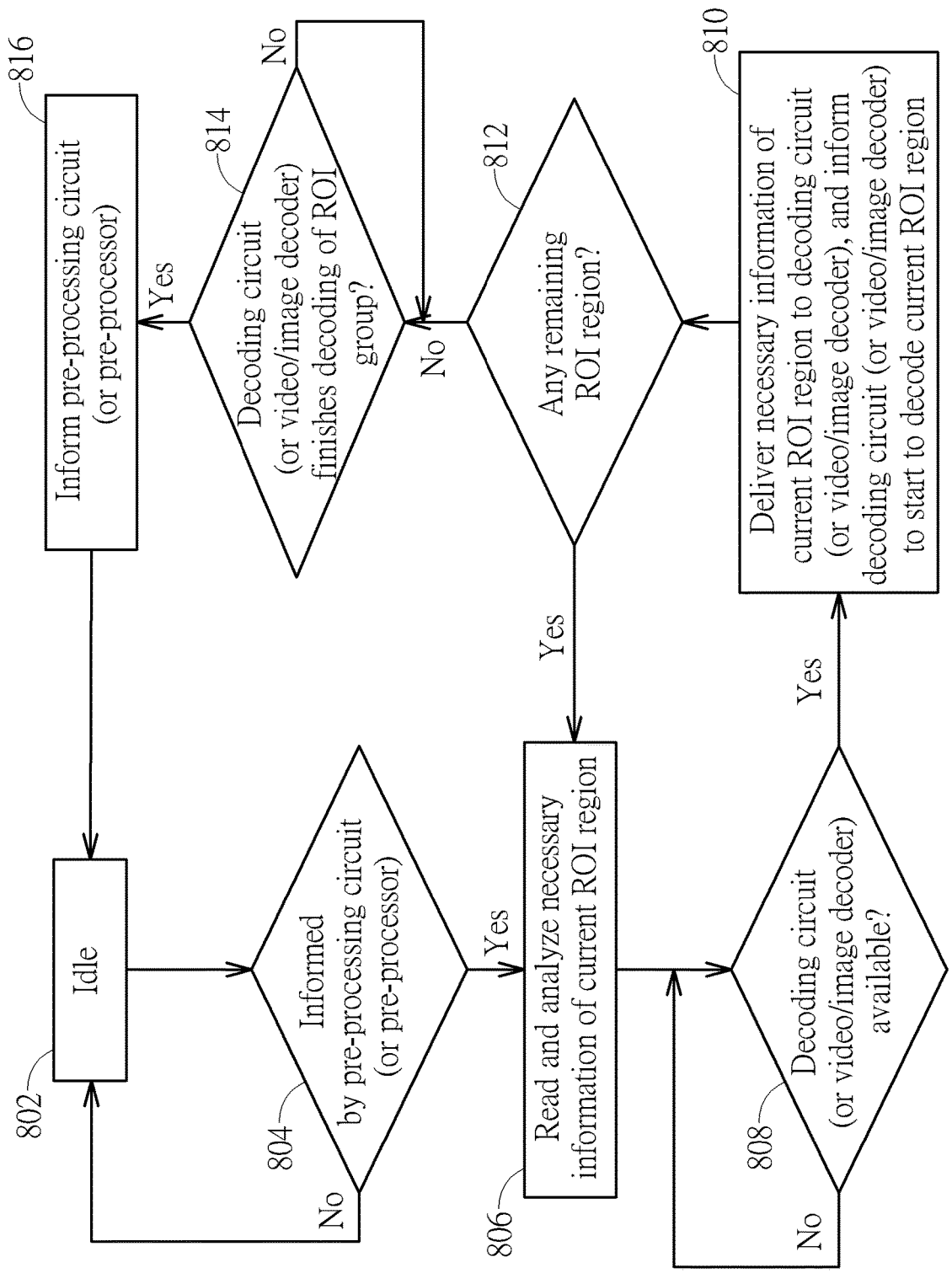
FIG. 8 is a flowchart illustrating an information fetching operation according to an embodiment of the present invention.

FIG. 8 is a flowchart illustrating an information fetching operation according to an embodiment of the present invention. The information fetching operation shown in FIG. 8 may be performed by the information fetching circuit 106 (or info-fetcher 404). Initially, the information fetching circuit 106 (or info-fetcher 404) is in an idle state (step 802). The information fetching circuit 106 (or info-fetcher 404) in the idle state means that the information fetching circuit 106 (or info-fetcher 404) does not deal with delivery of necessary information of ROI region(s), handshaking with the pre-processing circuit 104 (or pre-processor 402), and handshaking with the decoding circuit 108 (or video/image decoder 502) at this moment.

At step 804, the information fetching circuit 106 (or info-fetcher 404) checks if the pre-processing circuit 104 (or pre-processor 402) informs that necessary information of a current ROI group is ready in the storage device 102. When the pre-processing circuit 104 (or pre-processor 402) does not inform the information fetching circuit 106 (or info-fetcher 404) that necessary information of the current ROI group is ready in the storage device 102, the flow proceeds with step 802, such that the information fetching circuit 106 (or info-fetcher 404) stays in the idle state. When the pre-processing circuit 104 (or pre-processor 402) informs the information fetching circuit 106 (or info-fetcher 404) that necessary information of the current ROI group is ready in the storage device 102 through one of the handshaking mechanisms shown in FIG. 4, the flow proceeds with step 806, such that the information fetching circuit 106 (or info-fetcher 404) leaves the idle state and enters a normal state. The information fetching circuit 106 (or info-fetcher 404) in the normal state means that the information fetching circuit 106 (or info-fetcher 404) is operative to deal with delivery of necessary information of ROI region(s), handshaking with the pre-processing circuit 104 (or pre-processor 402), and handshaking with the decoding circuit 108 (or video/image decoder 502).

At step 806, the information fetching circuit 106 (or info-fetcher 404) starts to read necessary information of an ROI group from the storage device 102. For example, the information fetching circuit 106 (or info-fetcher 404) reads necessary information of a current ROI region in the ROI group from the storage device 102, and analyzes necessary information of the current ROI region.

At step 808, the information fetching circuit 106 (or info-fetcher 404) checks if the decoding circuit 108 (or video/image decoder 502) is in an idle state. The decoding circuit 108 (or video/image decoder 502) in the idle state means that the decoding circuit 108 (or video/image decoder 502) does not deal with decoding of any ROI region at this moment. When the decoding circuit 108 (or video/image decoder 502) is not in the idle state, the decoding circuit 108 (or video/image decoder 502) is not available to decoding of the current ROI region. Hence, the flow proceeds with step 808 to check availability of the decoding circuit 108 (or video/image decoder 502) again. When the decoding circuit 108 (or video/image decoder 502) is in the idle state, the flow proceeds with step 810.

At step 810, the information fetching circuit 106 (or info-fetcher 404) delivers necessary information of the current ROI region in the ROI group to the decoding circuit 108 (or video/image decoder 502), and informs the decoding circuit 108 (or video/image decoder 502) to start to decode the current ROI region. For example, one of the handshaking mechanisms shown in FIG. 5 may be used. Next, the flow proceeds with step 812.

At step 812, the information fetching circuit 106 (or info-fetcher 404) checks if there is any remaining ROI region in the ROI group. When the current ROI region is not the last ROI region in the ROI group, the flow proceeds with step 806, where a next ROI region in the ROI group becomes a current ROI region. When the current ROI region is the last ROI region in the ROI group, the delivery procedure of necessary information of all ROI regions in one ROI group is ended, and the flow proceeds with step 814.

At step 814, the information fetching circuit 106 (or info-fetcher 404) checks if the decoding circuit 108 (or video/image decoder 502) finishes decoding of the ROI group (particularly, decoding of the last ROI region in the ROI group). For example, the decoding circuit 108 (or video/image decoder 502) may inform the information fetching circuit 106 (or info-fetcher 404) that decoding of the ROI group (particularly, decoding of the last ROI region in the ROI group) is completed through one of the handshaking mechanisms shown in FIG. 5. When the decoding circuit 108 (or video/image decoder 502) does not inform that decoding of the ROI group (particularly, decoding of the last ROI region in the ROI group) is completed, the flow proceeds with step 814 to check the decoding progress again. When the decoding circuit 108 (or video/image decoder 502) informs that decoding of the ROI group (particularly, decoding of the last ROI region in the ROI group) is completed, the flow proceeds with step 816.

At step 816, the information fetching circuit 106 (or info-fetcher 404) informs the pre-processing circuit 104 (or pre-processor 402) through one of the handshaking mechanisms shown in FIG. 4. In addition, the information fetching circuit 106 (or info-fetcher 404) leaves the normal stage and enters the idle state (step 802).

When one ROI group in an image includes multiple ROI regions in the image, the information fetching circuit 106 (or info-fetcher 404) informs the pre-processing circuit 104 (or pre-processor 402) once after decoding of all ROI regions in one ROI group is done. In this way, the communication times between the pre-processing circuit 104 (or pre-processor 402) and the information fetching circuit 106 (or info-fetcher 404) can be reduced.

For better understanding of technical features of the proposed decoding apparatus 100, several decoding examples are provided as below.

Figure 9:
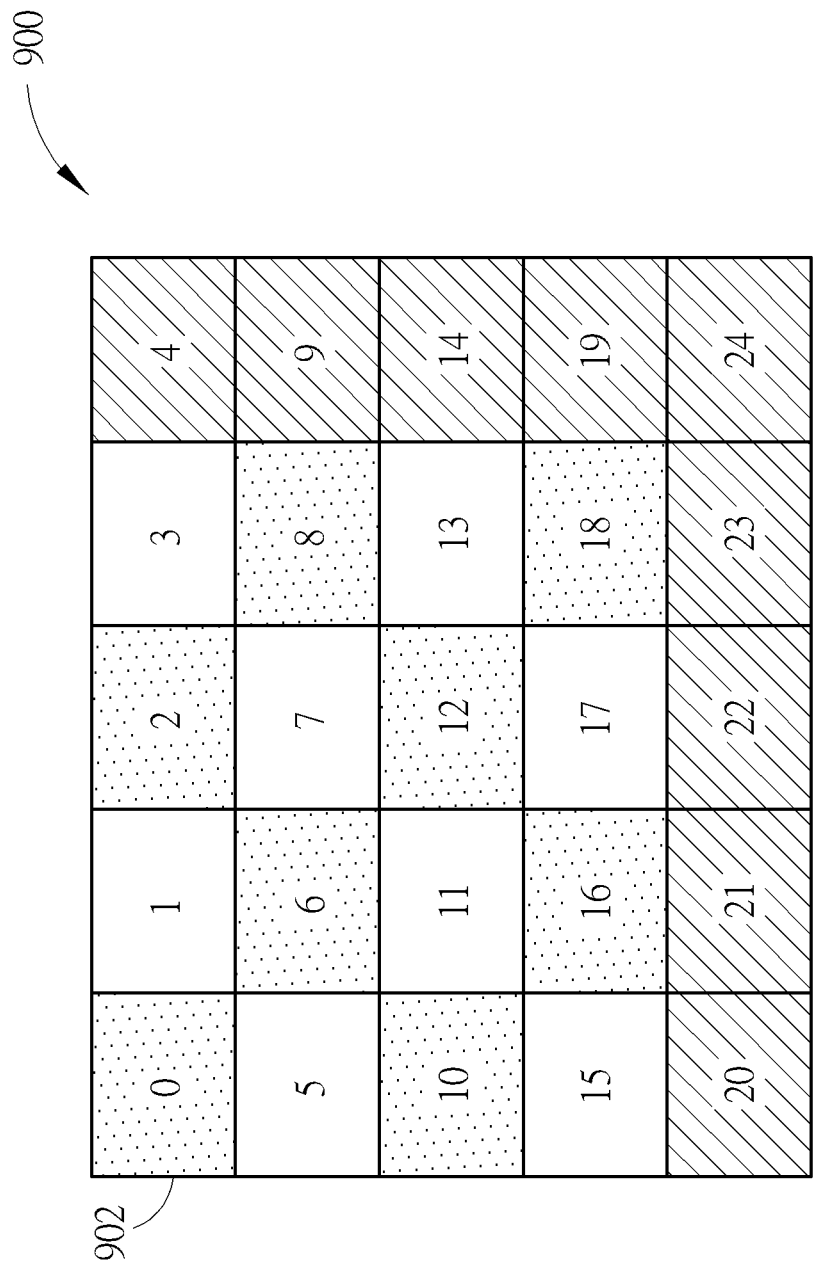
FIG. 9 is a diagram illustrating a first decoding example according to embodiment of the present invention.

FIG. 9 is a diagram illustrating a first decoding example according to embodiment of the present invention. One full image 900 contains 25 sub-frames 902. The 25 sub-frames 902 belong to 3 different groups. The first group consists of sub-frames designated by sub-frame indices "0", "2", "6", "8", "10", "12", "16", and "18. The second group consists of sub-frames designated by sub-frame indices "4", "9", "14", "19", and "20"-"24". The third group consists of sub-frames designated by sub-frame indices "1", "3", "5", "7", "11", "13", "15", and "17". The first group and the second group are ROI groups. The third group is a non-ROI group. Hence, the first group and the second group will be decoded one by one, while the third group will not be decoded.

After the bitstream BS of the image 900 is received by the decoding apparatus 100, the pre-processing circuit 104 parses the picture parameter set (PPS) of all sub-frames in the first group, and writes the necessary information to the storage device 102. The pre-processing circuit 104 informs the information fetching circuit 106. The information fetching circuit 106 reads and analyzes the necessary information, and informs the decoding circuit 108. The decoding circuit 108 decodes each sub-frame in the first group by decoding a part of the bitstream BS that may include slice header, slice data, residual coding syntax, etc. After all sub-frames in the first group are completely decoded, the information fetching circuit 106 informs the pre-processing circuit 104.

Similarly, the pre-processing circuit 104 parses the PPS of all sub-frames in the second group, and writes the necessary information to the storage device 102. The pre-processing circuit 104 informs the information fetching circuit 106. The information fetching circuit 106 reads and analyzes the necessary information, and informs the decoding circuit 108. The decoding circuit 108 decodes each sub-frame in the second group by decoding apart of the bitstream BS that may include slice header, slice data, residual coding syntax, etc.

After all sub-frames in the second group are completely decoded, the information fetching circuit 106 informs the pre-processing circuit 104.

The decoding results of the first group and the second group can be combined to create a decoded image.

Figure 10:
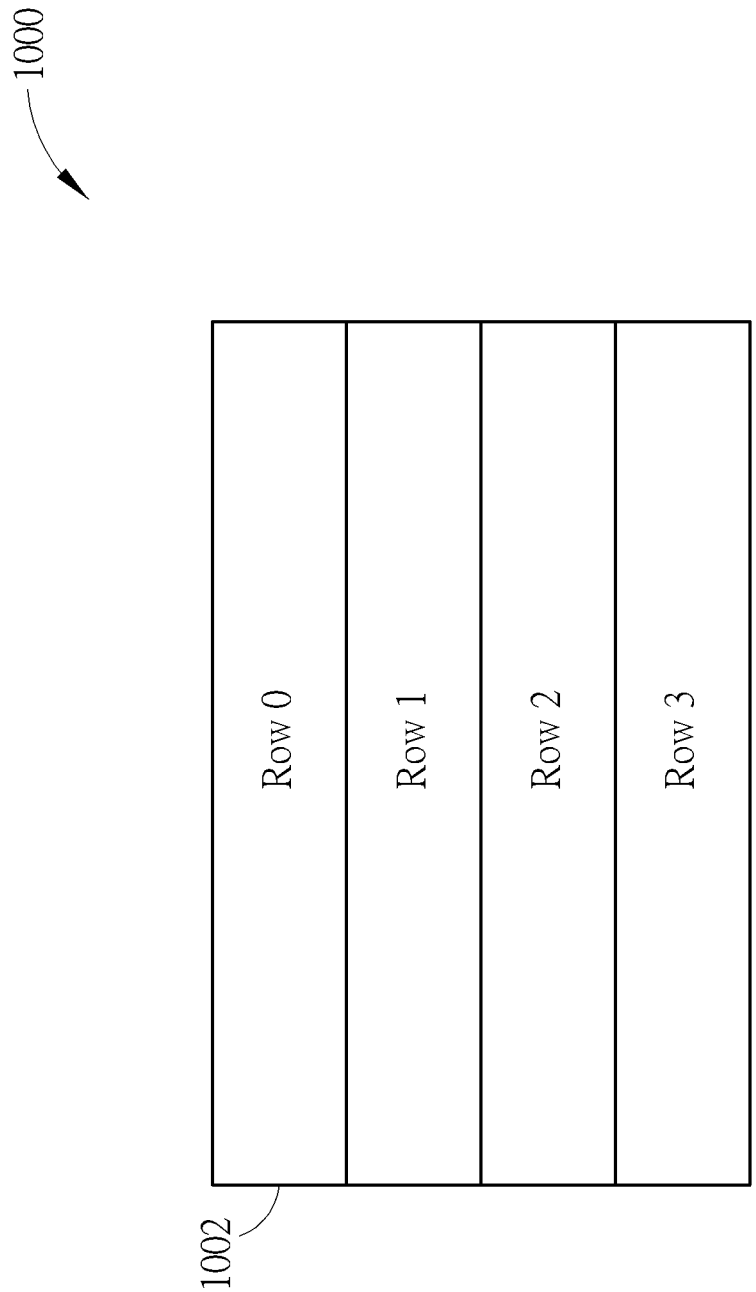
FIG. 10 is a diagram illustrating a second decoding example according to embodiment of the present invention.

FIG. 10 is a diagram illustrating a second decoding example according to embodiment of the present invention. One full image 1000 contains 4 rows 1002, each having a plurality of blocks. The 4 rows belong to 4 different groups. For example, a row denoted by "Row 0" is mapped to a first group, a row denoted by "Row 1" is mapped to a second group, a row denoted by "Row 2" is mapped to a third group, and a row denoted by "Row 3" is mapped to a fourth group. The first group, the second group, the third group, and the fourth group are all ROI groups. Hence, the first group, the second group, the third group, and the fourth group will be decoded one by one.

After the bitstream BS of the image 1000 is received by the decoding apparatus 100, the pre-processing circuit 104 parses the slice header of the row "Row 0" in the first group, and writes the necessary information to the storage device 102. The pre-processing circuit 104 informs the information fetching circuit 106. The information fetching circuit 106 reads and analyzes the necessary information, and informs the decoding circuit 108. The decoding circuit 108 decodes the whole row "Row 0" in the first group by decoding a part of the bitstream BS that may include coding unit (CU) syntax, prediction unit (PU) syntax, residual coding syntax, etc. After the whole row "Row 0" in the first group is completely decoded, the information fetching circuit 106 informs the pre-processing circuit 104.

Similarly, the pre-processing circuit 104 parses the slice header of the row "Row 1" in the second group, and writes the necessary information to the storage device 102. The pre-processing circuit 104 informs the information fetching circuit 106. The information fetching circuit 106 reads and analyzes the necessary information, and informs the decoding circuit 108. The decoding circuit 108 decodes the whole row "Row 1" in the second group by decoding a part of the bitstream BS that may include coding unit (CU) syntax, prediction unit (PU) syntax, residual coding syntax, etc. After the whole row "Row 1" in the second group is completely decoded, the information fetching circuit 106 informs the pre-processing circuit 104.

The pre-processing circuit 104 parses the slice header of the row "Row 2" in the third group, and writes the necessary information to the storage device 102. The pre-processing circuit 104 informs the information fetching circuit 106. The information fetching circuit 106 reads and analyzes the necessary information, and informs the decoding circuit 108. The decoding circuit 108 decodes the whole row "Row 2" in the third group by decoding a part of the bitstream BS that may include coding unit (CU) syntax, prediction unit (PU) syntax, residual coding syntax, etc. After the whole row "Row 2" in the third group is completely decoded, the information fetching circuit 106 informs the pre-processing circuit 104.

The pre-processing circuit 104 parses the slice header of the row "Row 3" in the fourth group, and writes the necessary information to the storage device 102. The pre-processing circuit 104 informs the information fetching circuit 106. The information fetching circuit 106 reads and analyzes the necessary information, and informs the decoding circuit 108. The decoding circuit 108 decodes the whole row "Row 3" in the fourth group by decoding a part of the bitstream BS that may include coding unit (CU) syntax, prediction unit (PU) syntax, residual coding syntax, etc. After the whole row "Row 3" in the fourth group is completely decoded, the information fetching circuit 106 informs the pre-processing circuit 104.

The decoding results of the first group, the second group, the third group, and the fourth group can be combined to create a decoded image.

Figure 11:
FIG. 11 is a diagram illustrating a third decoding example according to embodiment of the present invention.

FIG. 11 is a diagram illustrating a third decoding example according to embodiment of the present invention. One full image 1100 contains 4 tile/sub-frame rows 1102. The 4 tile/sub-frame rows belong to 4 different groups. For example, a tile/sub-frame row denoted by "Tile/sub-frame Row 0" is mapped to a first group, a tile/sub-frame row denoted by "Tile/sub-frame Row 1" is mapped to a second group, a tile/sub-frame row denoted by "Tile/sub-frame Row 2" is mapped to a third group, and a tile/sub-frame row denoted by "Tile/sub-frame Row 3" is mapped to a fourth group. The first group, the second group, the third group, and the fourth group are all ROI groups. Hence, the first group, the second group, the third group, and the fourth group will be decoded one by one.

After the bitstream BS of the image 1100 is received by the decoding apparatus 100, the pre-processing circuit 104 parses the slice header of all tiles/sub-frames in the first group, and writes the necessary information to the storage device 102. The pre-processing circuit 104 informs the information fetching circuit 106. The information fetching circuit 106 reads and analyzes the necessary information, and informs the decoding circuit 108. The decoding circuit 108 decodes all tiles/sub-frames in the first group by decoding a part of the bitstream BS that may include coding unit (CU) syntax, prediction unit (PU) syntax, residual coding syntax, etc. After all tiles/sub-frames in the first group are completely decoded, the information fetching circuit 106 informs the pre-processing circuit 104.

Similarly, the pre-processing circuit 104 parses the slice header of all tiles/sub-frames in the second group, and writes the necessary information to the storage device 102. The pre-processing circuit 104 informs the information fetching circuit 106. The information fetching circuit 106 reads and analyzes the necessary information, and informs the decoding circuit 108. The decoding circuit 108 decodes all tiles/sub-frames in the second group by decoding a part of the bitstream. BS that may include coding unit (CU) syntax, prediction unit (PU) syntax, residual coding syntax, etc. After all tiles/sub-frames in the second group is completely decoded, the information fetching circuit 106 informs the pre-processing circuit 104.

The pre-processing circuit 104 parses the slice header of all tiles/sub-frames in the third group, and writes the necessary information to the storage device 102. The pre-processing circuit 104 informs the information fetching circuit 106. The information fetching circuit 106 reads and analyzes the necessary information, and informs the decoding circuit 108. The decoding circuit 108 decodes all tiles/sub-frames in the third group by decoding a part of the bitstream BS that may include coding unit (CU) syntax, prediction unit (PU) syntax, residual coding syntax, etc. After all tiles/sub-frames in the third group is completely decoded, the information fetching circuit 106 informs the pre-processing circuit 104.

The pre-processing circuit 104 parses the slice header of all tiles/sub-frames in the fourth group, and writes the necessary information to the storage device 102. The pre-processing circuit 104 informs the information fetching circuit 106. The information fetching circuit 106 reads and analyzes the necessary information, and informs the decoding circuit 108. The decoding circuit 108 decodes all tiles/ sub-frames in the fourth group by decoding a part of the bitstream BS that may include coding unit (CU) syntax, prediction unit (PU) syntax, residual coding syntax, etc. After all tiles/sub-frames in the fourth group is completely decoded, the information fetching circuit 106 informs the pre-processing circuit 104.

The decoding results of the first group, the second group, the third group, and the fourth group can be combined to create a decoded image.

Figure 12:
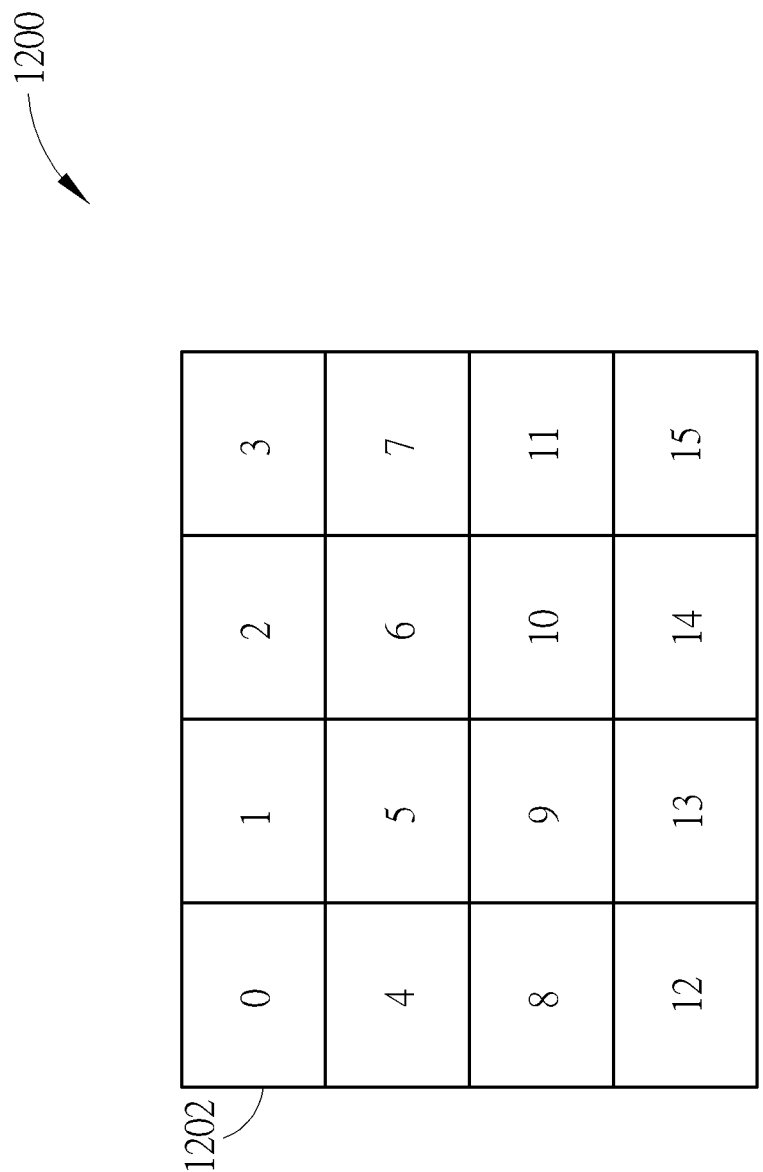
FIG. 12 is a diagram illustrating a fourth decoding example according to embodiment of the present invention.

FIG. 12 is a diagram illustrating a fourth decoding example according to embodiment of the present invention. One full image 1200 contains 16 sub-frames 1202. The 16 sub-frames 1202 belong to a single group that is an ROI group. After the bitstream BS of the image 1200 is received by the decoding apparatus 100, the pre-processing circuit 104 parses the picture parameter set (PPS) of all sub-frames in the single group, and writes the necessary information to the storage device 102. The pre-processing circuit 104 informs the information fetching circuit 106. The information fetching circuit 106 reads and analyzes the necessary information, and informs the decoding circuit 108. The decoding circuit 108 decodes each sub-frame in the single group by decoding a part of the bitstream BS that may include slice header, slice data, residual coding syntax, etc. After all sub-frames in the single group are completely decoded, a decoded image is generated, and the information fetching circuit 106 informs the pre-processing circuit 104.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A decoding apparatus for decoding region of interest (ROI) regions in an image, comprising:
    a storage device;
    a pre-processing circuit, arranged to perform a syntax pre-parsing operation upon a bitstream to obtain necessary information of the ROI regions, and store the necessary information of the ROI regions into the storage device;
    a decoding circuit, arranged to perform a decoding operation upon the bitstream to decode the ROI regions, wherein at least a portion of the necessary information of the ROI regions is used by the decoding operation, and the decoding operation comprises syntax parsing of the bitstream; and
    an information fetching circuit, arranged to read the necessary information of the ROI regions from the storage device, analyze the necessary information of the ROI regions read from the storage device, and deliver said at least a portion of the necessary information of the ROI regions to the decoding circuit;
    wherein a processing time of obtaining the necessary information of one ROI region at the pre-processing circuit overlaps the processing time of decoding another ROI region at the decoding circuit.

2. The decoding apparatus of claim 1, wherein the pre-processing circuit is a processor that performs the syntax pre-parsing operation by executing software, the decoding circuit is a hardware decoder that performs the decoding operation by dedicated hardware, and the information fetching circuit performs handshaking with the pre-processing circuit and handshaking with the decoding circuit by dedicated hardware.

3. The decoding apparatus of claim 1, wherein the pre-processing circuit is further arranged to check if the storage device has free space available to the syntax pre-parsing operation; and after determining that the storage device has free space available to the syntax pre-parsing operation, the pre-processing circuit performs the syntax pre-parsing operation to obtain necessary information of an ROI group, where the ROI group comprises at least one ROI region in the image.

4. The decoding apparatus of claim 1, wherein the ROI regions comprise a first ROI region and a second ROI region that are decoded by the decoding circuit sequentially; and the pre-processing circuit performs the syntax pre-parsing operation to obtain necessary information of the second ROI region, regardless of a progress of decoding the first ROI region at the decoding circuit.

5. The decoding apparatus of claim 1, wherein the pre-processing circuit is further arranged to check if the information fetching circuit is in an idle state after necessary information of an ROI group is ready in the storage device, where the ROI group comprises at least one ROI region in the image; and after determining that the information fetching circuit is in the idle state, the pre-processing circuit informs the information fetching circuit that the necessary information of the ROI group is ready in the storage device.

6. The decoding apparatus of claim 5, wherein the ROI group comprises multiple ROI regions in the image; and after all necessary information of said multiple ROI regions is ready in the storage device, the pre-processing circuit informs the information fetching circuit once.

7. The decoding apparatus of claim 1, wherein the information fetching circuit is further arranged to check if the pre-processing circuit informs that necessary information of an ROI group is ready in the storage device, where the ROI group comprises at least one ROI region in the image; and after informed by the pre-processing circuit that the necessary information of the ROI group is ready in the storage device, the information fetching circuit starts to read the necessary information of the ROI group from the storage device.

8. The decoding apparatus of claim 7, wherein the information fetching circuit is further arranged to check if the decoding circuit is in an idle state; and after determining that the decoding circuit is in the idle state, the information fetching circuit delivers at least a portion of the necessary information of the ROI group to the decoding circuit.

9. The decoding apparatus of claim 8, wherein the information fetching circuit is further arranged to check if the decoding circuit finishes decoding of the ROI group; and after determining that the decoding circuit finishes decoding of the ROI group, the information fetching circuit informs the pre-processing circuit.

10. The decoding apparatus of claim 9, wherein the ROI group comprises multiple ROI regions in the image; and after decoding of all of said multiple ROI regions is done, the information fetching circuit informs the pre-processing circuit once.

11. A decoding method for decoding region of interest (ROI) regions in an image, comprising:
    performing a syntax pre-parsing operation upon a bitstream to obtain necessary information of the ROI regions;
    storing the necessary information of the ROI regions into a storage device;
    performing a decoding operation upon the bitstream to decode the ROI regions, wherein at least a portion of the necessary information of the ROI regions is used by the decoding operation, and the decoding operation comprises syntax parsing of the bitstream; and utilizing an information fetching circuit for reading the necessary information of the ROI regions from the storage device, analyzing the necessary information of the ROI regions read from the storage device, and delivering said at least a portion of the necessary information of the ROI regions to the decoding operation;

wherein a processing time of obtaining the necessary information of one ROI region by the syntax pre-parsing operation overlaps the processing time of decoding another ROI region by the decoding operation.

12. The decoding method of claim 11, wherein the syntax pre-parsing operation is performed by executing software, the decoding operation is performed by dedicated hardware, and the information fetching circuit performs handshaking with the syntax pre-parsing operation and handshaking with the decoding operation by dedicated hardware.

13. The decoding method of claim 11, wherein performing the syntax pre-parsing operation upon the bitstream comprises:

checking if the storage device has free space available to the syntax pre-parsing operation; and after determining that the storage device has free space available to the syntax pre-parsing operation, performing the syntax pre-parsing operation to obtain necessary information of an ROI group, where the ROI group comprises at least one ROI region in the image.

14. The decoding method of claim 11, wherein the ROI regions comprise a first ROI region and a second ROI region that are decoded by the decoding operation sequentially; and the syntax pre-parsing operation is performed to obtain necessary information of the second ROI region, regardless of a progress of decoding the first ROI region by the decoding operation.

15. The decoding method of claim 11, wherein performing the syntax pre-parsing operation upon the bitstream comprises:

after necessary information of an ROI group is ready in the storage device, checking if the information fetching circuit is in an idle state, where the ROI group comprises at least one ROI region in the image; and after determining that the information fetching circuit is in the idle state, informing the information fetching circuit that the necessary information of the ROI group is ready in the storage device.

16. The decoding method of claim 15, wherein the ROI group comprises multiple ROI regions in the image; and after all necessary information of said multiple ROI regions is ready in the storage device, the information fetching circuit is informed once.

17. The decoding method of claim 11, wherein reading the necessary information of the ROI regions from the storage device comprises:

checking if it is informed that necessary information of an ROI group is ready in the storage device, where the ROI group comprises at least one ROI region in the image; and after it is informed that the necessary information of the ROI group is ready in the storage device, starting to read the necessary information of the ROI group from the storage device.

18. The decoding method of claim 17, wherein delivering said at least a portion of the necessary information of the ROI regions to the decoding operation comprises:

checking if the decoding operation is in an idle state; and after determining that the decoding operation is in the idle state, delivering at least a portion of the necessary information of the ROI group to the decoding operation.

19. The decoding method of claim 18, further comprising:

checking if the decoding operation finishes decoding of the ROI group; and after determining that the decoding operation finishes decoding of the ROI group, informing the syntax pre-parsing operation.

20. The decoding method of claim 19, wherein the ROI group comprises multiple ROI regions in the image; and after decoding of all of said multiple ROI regions is done, the syntax pre-parsing operation is informed once.

* * * * *